No Printed Specification Available

8727X

E. Whitman,

Washing Machine,

Patented Mar. 27, 1835.

Ezra Whitman Jr. assignee of Ezra Whitman
Washing Machine

The Schedule referred to in these Letters Patent and making part of the same; containing a description in the words of the said Ezra Whitman himself, of his improvement in the Washing Machine.

Be it Known that I Ezra Whitman of Winthrop in the county of Kennebec and State of Maine have invented a new and useful improvement in the Washing Machine and that the following is a full and exact description of the construction and operation of the said Machine as invented or improved by me, reference being made to the accompanying plate.—

Figure 2:
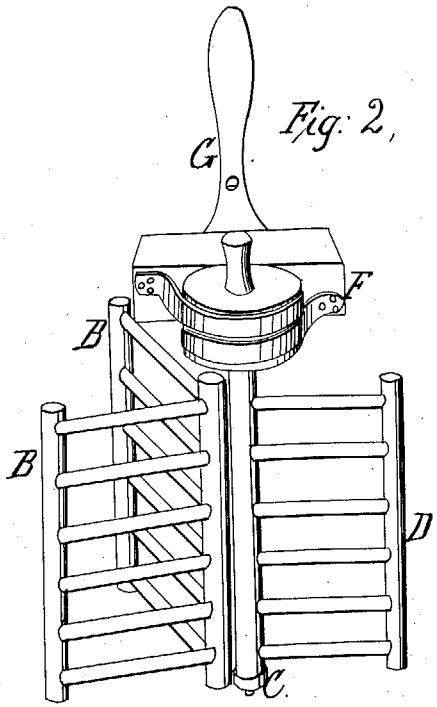
Figure 1:
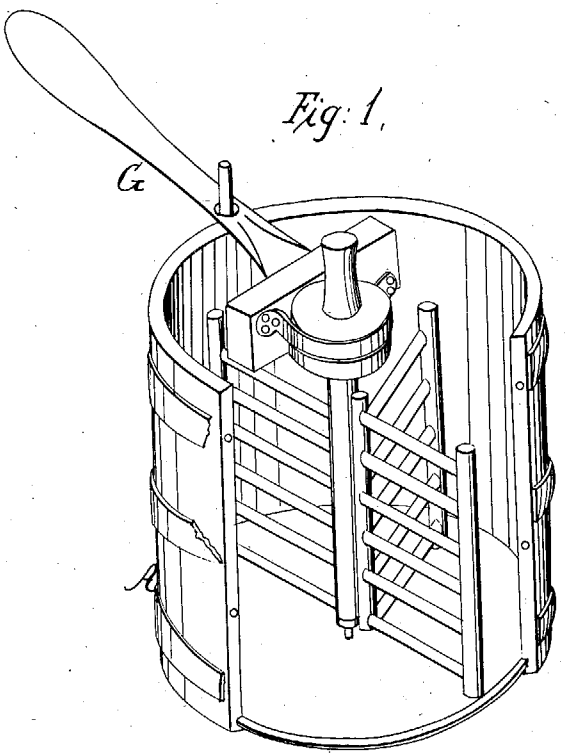

Fig 1 A is a tub or cistern divested of its top or cover, and a part of the staves to show the interior. B.B. are round rods of wood forming a grating which is fixed firmly to the sides of the tub, each side is fixed to a common upright or post, so as to make an angle with each other.—
C is an upright post fixed upon a pivot in the centre of the tub, to this is affixed a grating of wood as before described, on the upper part of this shaft, is a drum or pulley E. around which I put a strap of leather, each end of which is nailed to a piece of plank or wood F. in the middle of this piece of wood is placed a lever or handle G, which is placed upon an axle or gudgeon as a fulcrum —
Fig. 2. Represents the dashers or gratings of wood, detached from the tub—
The mode of operation is the following, after putting in the water and the clothes to be washed, by pushing the handle or lever backward and forward, the revolving dasher D. presses first on one side of the fixed dashers B.B.

and then the other, thus pressing and squeezing the articles to be washed as long as you please —

Churning may be also effectually and expeditiously done by this means —

Sometimes I attach a bevel geer to the upright shaft which moves the revolving dashers instead of the strap, but generally prefer the strap.

Claims — I claim as my improvement, the arrangement of the dashers and the mode of putting them in motion, as above specified —

In testimony that the above is a true specification of my said improvement as above described, I have hereunto set my hand this fifth day of March 1835.

Witnesses
Ezekiel Holmes }
Seth May. } Ezra Whitman

[illegible] [399 words]

(Drawing)